United States Patent
Simonton

(10) Patent No.: US 11,762,090 B2
(45) Date of Patent: Sep. 19, 2023

(54) ICE TRANSDUCER

(71) Applicant: Garmin Switzerland GmbH, Schaffhausen (CH)

(72) Inventor: Troy D. Simonton, Paola, KS (US)

(73) Assignee: Garmin Switzerland GmbH

( * ) Notice: Subject to any disclaimer, the term of this patent is extended or adjusted under 35 U.S.C. 154(b) by 273 days.

(21) Appl. No.: 15/929,752

(22) Filed: May 20, 2020

(65) Prior Publication Data

US 2021/0364636 A1    Nov. 25, 2021

(51) Int. Cl.
*G01S 15/96* (2006.01)
*G01S 7/62* (2006.01)
*G01S 7/521* (2006.01)

(52) U.S. Cl.
CPC .............. *G01S 15/96* (2013.01); *G01S 7/521* (2013.01); *G01S 7/62* (2013.01)

(58) Field of Classification Search
None
See application file for complete search history.

(56) References Cited

U.S. PATENT DOCUMENTS

| | | | |
|---|---|---|---|
| 6,377,516 B1 | 4/2002 | Whiteside et al. | |
| 2004/0105343 A1* | 6/2004 | Betts | G01S 7/003 367/111 |
| 2006/0050615 A1* | 3/2006 | Swisher | G01S 7/521 367/173 |
| 2006/0164919 A1* | 7/2006 | Watanabe | B06B 1/0622 367/153 |
| 2007/0242134 A1* | 10/2007 | Zernov | B63G 8/001 348/81 |
| 2008/0068926 A1* | 3/2008 | Chambers | G01S 15/96 367/87 |
| 2016/0245915 A1* | 8/2016 | Clark | G01S 7/6281 |
| 2018/0033417 A1* | 2/2018 | Antao | G01D 11/30 |
| 2019/0265354 A1* | 8/2019 | Antao | G01S 7/521 |

OTHER PUBLICATIONS

Garmin Panoptix Ice Fishing Kit from https://buy.garmin.com/en-US/US/p/633809, published prior to May 20, 2020.
Garmin Panoptix PS21-TR Installation Instructions http://static.garmin.com/pumac/Panoptix_21_Install_EN.pdf, published prior to May 20, 2020.
Printout from http://www.airmar.com/uploads/brochures/p48W.pdf, published prior to May 20, 2020.
Printout from http://www.beambender.com/, published prior to May 20, 2020.

* cited by examiner

*Primary Examiner* — Hovhannes Baghdasaryan
(74) *Attorney, Agent, or Firm* — Samuel M. Korte; Max M. Ali

(57) ABSTRACT

A transducer system for locating fish in water beneath ice. A cable coupled with a transducer housing both physically suspends the housing at a selected depth and a selected angular orientation and conveys sonar data to a display unit on the surface. First and second transducers are mounted in the housing and generate the sonar data. The transducers are mounted so as to have different relative angular orientations.

14 Claims, 3 Drawing Sheets

ICE TRANSDUCER

BACKGROUND

Portable systems exist to facilitate ice fishing by assisting in locating fish in water beneath ice. Such systems typically include a transducer configured to emit signals into the water and to receive signals which have been reflected by fish and other objects in the water, and a display unit configured to provide a visual representation of the objects based on data from the transducer. Typically, an ice fisherman drills multiple spaced-apart holes in the ice over a body of water and then assembles and employs the portable system at an initial hole. This includes suspending the transducer in the water from a rigid vertical pole or from a float.

The pole must have sufficient length to position the transducer at a selected depth so as to be a particular distance below the ice, which in some locales (e.g., Canada) can be up to five feet thick, which makes even a collapsible pole undesirably large. Additionally, the jacket of the cable coupling the transducer to the display unit on the surface is typically constructed of silicon or thermoplastic elastomer which becomes undesirably stiff in very cold water. If no fish are located or if fish are located some distance from the initial hole, the fisherman must disassemble, transport, and reassemble the system at another hole. An overly large pole and/or an unduly stiff cable can make this repositioning process less enjoyable.

SUMMARY

Embodiments provide a transducer system for locating fish in water beneath ice, in which a cable coupled with a transducer housing both physically suspends the housing at a selected depth and angular orientation and conveys fish location data to the surface. Embodiments advantageously eliminate the need for a pole and thereby increases the ease and speed of disassembling, transporting, and reassembling the system as desired or needed.

In one embodiment, a transducer comprises a transducer unit including a transducer housing and first and second transducers, and a cable coupling the transducer unit to an electronic display unit. The first transducer may be associated with a first portion of the transducer housing, and configured to generate first sonar data corresponding to a first direction. The second transducer may be associated with a second portion of the transducer housing, and configured to generate second sonar data corresponding to a second direction. The cable may be configured to both physically suspend the transducer housing in the water and to electronically convey the data from the first and second transducers to the electronic display unit. The cable may attach to the transducer housing such that the second transducer is normally oriented at approximately ninety degrees below horizontal in the water.

Various implementations of the foregoing embodiment may include any one or more of the following additional features. The first transducer may include a steered array transducer incorporating a phase steered technology or a frequency steered technology. The second transducer may include a conical transducer element or a scanning transducer element. The cable may include a jacket constructed of a material which remains flexible in the water at least between zero degrees and five degrees Celsius and in some embodiments at least down to negative thirty degrees Celsius. The cable may include a Kevlar core. The first transducer may be normally oriented at approximately fifteen degrees below horizontal in the water.

The system may further include an angle setting mechanism configured to allow for selectively orienting the transducer housing such that the first transducer is oriented at approximately zero, fifteen, forty-five, and ninety degrees below horizontal in the water. The angle setting mechanism may include a cable clip mechanism configured to bend the cable so as to selectively orient the transducer housing. The system may further include a support bar configured to extend horizontally across a hole in ice over the water and to physically support the cable so that the transducer housing is positioned at the selected depth. The support bar may include an angle setting mechanism configured to allow for selectively orienting the transducer housing such that the first transducer is oriented at approximately zero, fifteen, forty-five, and ninety degrees below horizontal in the water. The system may further include a reel configured to selectively wind to retract the cable and unwind to extend the cable. The system may further include a float coupled with the cable and configured to physically support the cable so that the transducer housing is positioned at the selected depth.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 5:
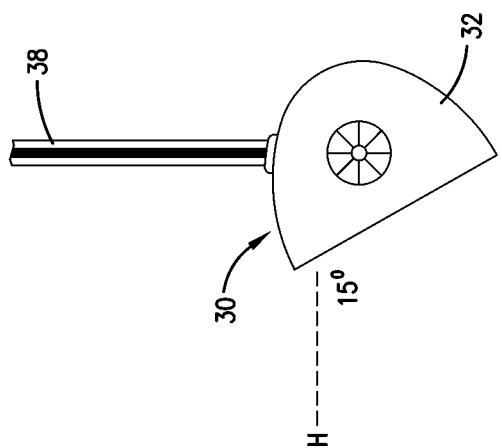
Figure 7:
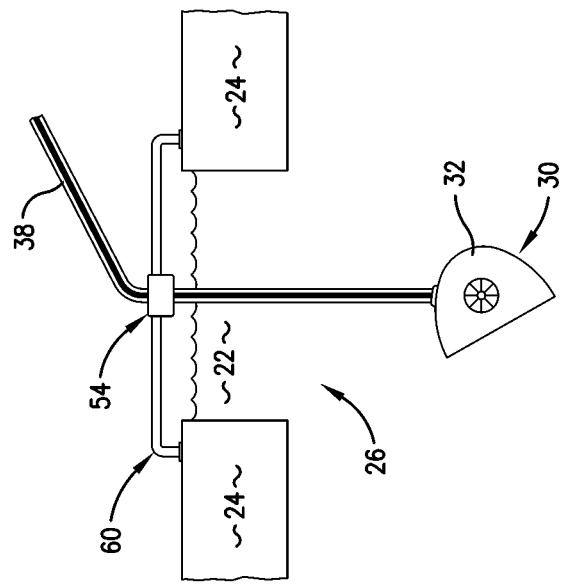
Figure 6:
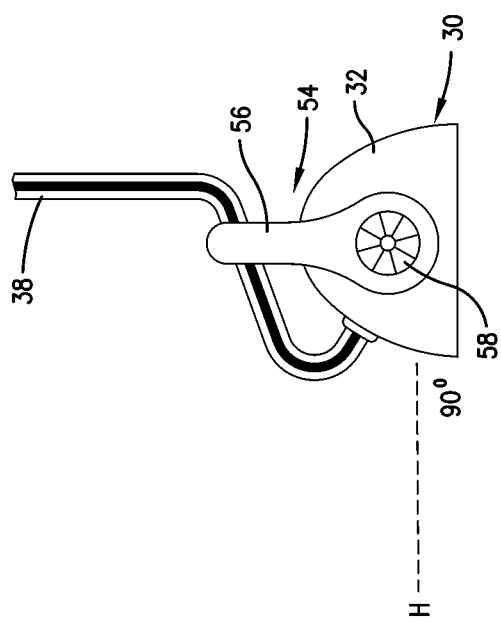

FIG. 5 is a fragmentary side elevation view of the transducer unit and the cable, wherein the angle setting mechanism is employed to orient the first transducer at approximately forty-five degrees below horizontal FIG. 6 is a fragmentary side elevation view of the transducer unit and the cable, wherein the angle setting mechanism is employed to orient the first transducer at approximately ninety degrees below horizontal; and FIG. 7 is a fragmentary, cross-sectional side elevation view of the transducer unit and the cable of the transducer system of FIG. 1, wherein a support bar component is employed to receive the cable and assist in supporting the transducer unit.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

As used herein, the term "approximately" shall mean within five percent (plus or minus) of the stated value, unless otherwise specified. All numerical values shall be considered approximate unless otherwise specified or unless otherwise understood from the context by one with ordinary skill in the art.

Broadly, embodiments provide a transducer system for locating fish, structure, and other objects and features in water beneath ice, in which a cable coupled with a transducer housing both physically suspends the housing at an angular orientation and conveys sonar data to the surface. In one embodiment, the transducer system may comprise a transducer unit, including a transducer housing and first and second transducers, and a cable coupling the transducer unit to an electronic display unit. The first transducer may be associated with a first portion of the transducer housing, and may be configured to generate first sonar data corresponding to a first direction. The second transducer may be associated with a second portion of the transducer housing, and may be configured to generate second sonar data regarding corresponding to a second direction. The cable may both suspend the transducer housing in the water at a selected depth and electronically convey the first and second data from the transducers to the display unit. The display unit may receive the data and display a visual indication of the location of the fish and other underwater structure and objects.

The transducers may be associated with the housing in such a manner as to have different relative angular orientations which determine the first and second directions. In one implementation, the cable may attach to the housing such that, when the housing hangs from the cable in the water, the first transducer is normally oriented at fifteen degrees below horizontal H (i.e., forwardly) and the second transducer is normally oriented at ninety degrees below horizontal H (i.e., downwardly). As should be appreciated, embodiments of the invention may orient the transducers in any direction. An angle setting mechanism may allow for selectively orienting the housing such that the first transducer is oriented at zero, fifteen, forty-five, ninety degrees, or any desired angle, below horizontal H in the water, with corresponding orientations of the second transducer.

Thus, embodiments of the transducer system advantageously eliminate the need for a pole and construct the cable from a material which remains flexible in typical ice fishing temperatures, and thereby increase the ease and speed of disassembling, transporting, and reassembling the system as desired or needed.

Figure 1:
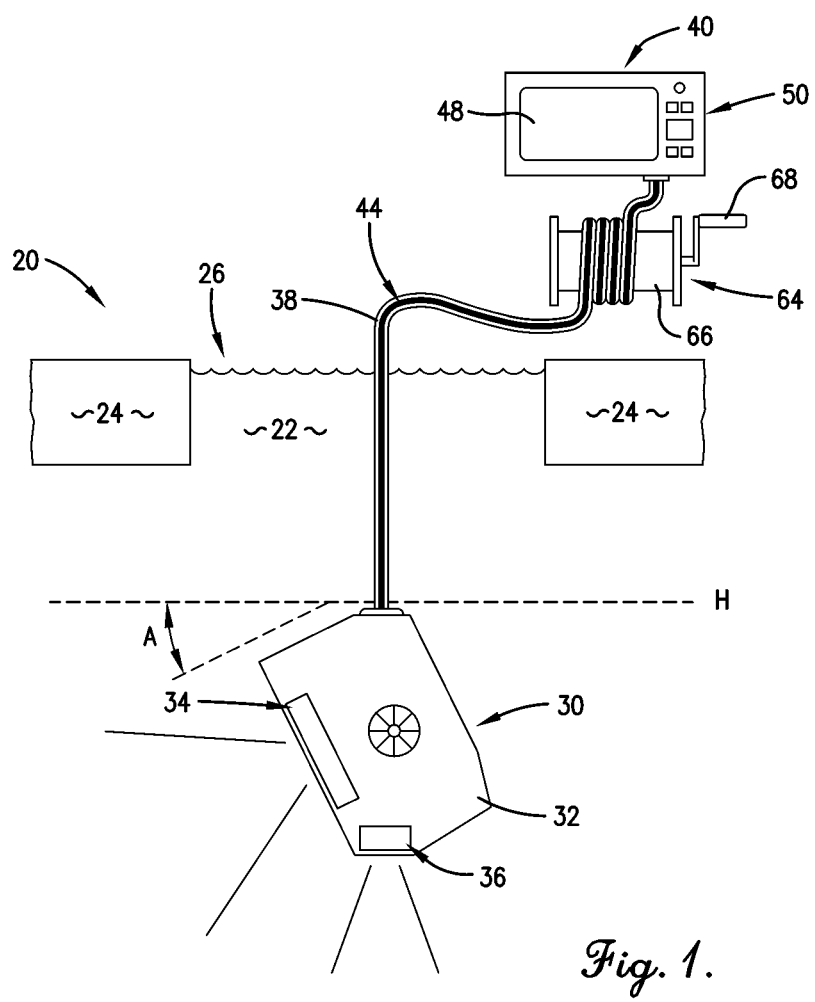
FIG. 1 is a fragmentary, cross-sectional side elevation view of an embodiment of a transducer system for assisting in locating fish in water beneath ice.

Referring to FIG. 1, a transducer system 20 is shown for assisting in locating fish in water 22 below ice 24 through a hole 26 in the ice 24. In one embodiment, the transducer system 20 may comprise a transducer unit 30, including a transducer housing 32 and first and second transducers 34, 36, and a cable 38 coupling the transducer unit 30 to an electronic display unit 40.

The first transducer 34 may be mounted in or on or otherwise physically associated with a first portion of the transducer housing 32, and may be configured to generate first sonar data corresponding to a first direction. The first transducer 34 may incorporate substantially any sonar technology, such as a steered array technology employing a scanning (e.g., "bar") transducer element. In various implementations, the first transducer 34 may incorporate a phase steered technology of a frequency steered technology. In The first transducer 34 may include one or more transducer elements or an array of transducer elements. Exemplary transducer elements may be formed from piezoelectric materials, like ceramics such as lead zirconate titanate (PZT) or polymers such as polyvinylidene difluoride (PVDF), which may change its dimension along one or more axes in response to an electronic signal applied to the material. In a typical implementation, an oscillating voltage may be applied to the piezoelectric material resulting in the material generating a mechanical oscillation at the same frequency as the oscillation of the voltage. In addition, the piezoelectric material may generate an oscillating electric voltage in response to oscillating acoustic waves applying pressure to the material which changes the dimension along one or more axes. In some implementations, the transducer 34 may include one or more individual transducer elements, wherein the faces of each transducer element are not necessarily aligned with the faces of other transducer elements. In other implementations, the transducer 34 may include one or more transducer arrays, wherein each transducer array includes a plurality of linearly-aligned transducer elements. The transducer arrays may be oriented in line with one another, parallel to one another, transverse to one another, or at any non-zero angle.

The second transducer 36 may be mounted in or on or be otherwise physically associated with a second portion of the transducer housing 32, and may be configured to generate second sonar data corresponding to a second direction. The second transducer 36 may incorporate substantially any sonar technology, and in various implementations may incorporate a conical transducer element (e.g., "puck") or a scanning transducer element.

In embodiments where the first transducer 34 and/or second transducer 36 include a conical transducer element, the conical transducer element may be formed in a circular or puck shape, with the element having a circular or semi-circular face with a diameter greater than its depth. However, the conical transducer element may present any physical or electrical configuration that generates a suitable beam. In configurations, the conical transducer element may be configured for "CHIRP" functionality and/or operate in one or more modes of operation.

In embodiments where the first transducer 34 and/or second transducer 36 include a scanning transducer element, the scanning transducer element may be formed in a rectangular bar shape, typically with a greater length dimension than width and height dimensions. Thus, the scanning transducer element may have two primary faces on opposing sides with the greatest surface area, as compared with the other faces. In configurations, the primary faces may have an elongated rectangular shape. However, scanning transducer element may present any physical or electrical configuration that generates a suitable beam for scanning sonar. In configurations, the one or more scanning transducer elements may be configured as sidescan and/or downward-facing scanning elements.

In operation, the first and second transducers 34, 36 may transmit ultrasonic signals into the water 22 in the first and second directions. The transducer elements may be formed from ceramic materials that exhibit piezoelectric transducing properties, such as barium titanate, lead titanate, lead zirconate titanate, lithium niobate, lithium tantalate, bismuth ferrite, sodium niobate, and the like, or combinations thereof. The transducing elements may vibrate in response to a periodic or oscillating electrical transmit signals applied to them. The transmit signals may be applied by amplifier circuits, electronic oscillator circuits, multivibrator circuits, signal generators, and the like, or combinations thereof. The vibrations of the transducing elements produce the ultrasonic signals having frequencies dictated by the transmit signals and the physical characteristics and dimensions of the respective elements.

The patterns of the ultrasonic signals generated by the transducer elements may depend to a degree on the shapes of the primary faces of the transmit elements. For example, a scanning transducer element, such as may be used in the first transducer 34, may generate an ultrasonic signal with a fan shape, wherein the aspect ratio of the base of the fan shape corresponds to the aspect ratio of one of the primary faces of the transmit element. A conical transducer element, such as may be used in the second transducer 36, may generate an ultrasonic signal with a roughly conical shape.

The ultrasonic signals generated by the transducer elements may be directional in nature. Typically, the ultrasonic signals are generated in directions that are normal to the surfaces of the primary faces of the respective transducer elements. In one implementation, each transducer element may include a single crystal that generates the ultrasonic signal. In another implementation, transducer elements may additionally or alternatively be configured as an array comprising a plurality of crystals to generate the desired beam patterns for steered, scanning, and conical sonar. Additional or alternative transducers may be incorporated into the transducer housing 32 in order to benefit from other technologies. For example, more than two transducers may be incorporated in housing 32. In one configuration, four transducers may be incorporated in housing 32, where each transducer is rotated 90 degrees from vertical with respect to other transducers to provide 360 degrees (or equivalent) sonar coverage.

Figure 2:
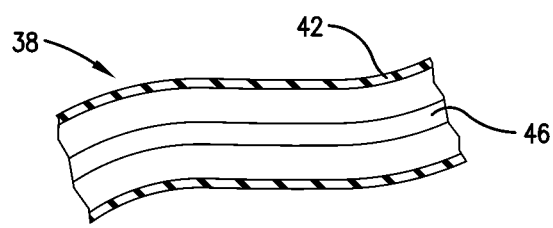
FIG. 2 is a fragmentary, cross-sectional view of a cable component of the transducer system of FIG. 1.
Figure 3:
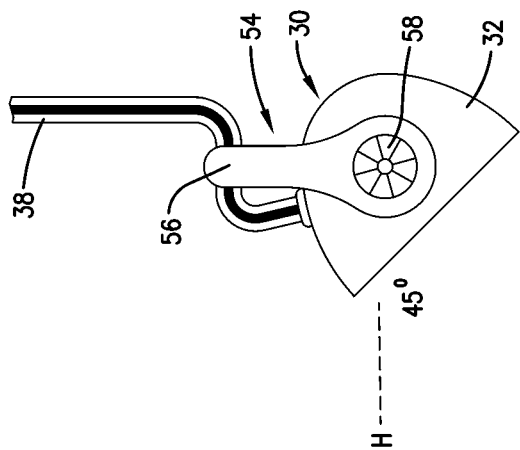
FIG. 3 is a fragmentary side elevation view of a transducer unit component and the cable of the transducer system of FIG. 1, wherein a first transducer component of the transducer unit is oriented at approximately fifteen degrees below horizontal.
Figure 4:
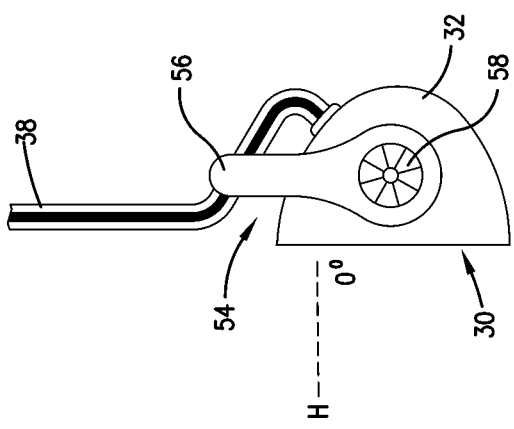
FIG. 4 is a fragmentary side elevation view of the transducer unit and the cable, wherein an angle setting mechanism component is employed to orient the first transducer at approximately zero degrees below horizontal.

The cable 38 may physically extend between and couple the transducer unit 30 to the electronic display unit 40 on the surface, and may be configured to both physically suspend the transducer housing 32 in the water and to electronically convey the first and second data to the display unit 40. Referring also to FIG. 2, in one implementation, the cable 38 may include a jacket 42 constructed of substantially any suitable material which remains flexible in the water. In one implementation, the jacket 42 may include a colored and/or molded stripe, keyway, or other element 44 to indicate for the user the general directional orientation of the transducer housing 32 in the water. In one implementation, the cable 38 may include a core 46 configured to strength the cable 38 and constructed of Kevlar or another suitable material.

The electronic display unit 40 may be configured to receive the first and second data from the first and second transducers 34, 36 via the cable 38, process the data, and display a visual indication of the location of the fish or other underwater structure. To that end, the display unit 40 may include a display monitor 48 for displaying the visual indication and a user interface 50 for controlling operation of the display unit 40. An example display monitor 48 may be six inches in width and between three and four inches in height, have a resolution of eight hundred by four hundred and eighty pixels, and employ wide video graphics array technology. The user interface 50 may include substantially any suitable technology such as touch screen, button, switch, knob, and voice activated technologies, and combinations thereof.

The first and second transducers 34, 36 may be associated with the transducer housing 32 in such a manner as to have different relative angular orientations. These relative angular orientations may be physically fixed, such that changing the orientation of the housing 32 changes the angular orientations of the transducers 34, 36 with respect to horizontal H but does not affect the relative angular orientations of the transducers 34, 36 with respect to each other. For example, if the first and second transducer 34, 36 are mounted in the housing 32 so as to be relatively oriented seventy-five degrees apart, then in one orientation of the housing 32 the first transducer 34 may be oriented fifteen degrees below horizontal H and the second transducer will be oriented ninety degrees below horizontal H, and in another orientation of the housing 32 the first transducer 34 may be oriented forty-five degrees below horizontal H and the second transducer will be oriented the same seventy-five degrees apart or one hundred and twenty degrees below horizontal H.

In various implementations, the cable 38 may attach to the transducer housing 32 such that, when the transducer housing 32 hangs normally from the cable 38, the first transducer 34 is normally oriented at fifteen degrees below horizontal H in the water 22, and/or the second transducer is normally oriented ninety degrees below horizontal H in the water 22. Referring also to FIGS. 3-6, the system 20 may further include an angle setting mechanism 54 allowing for selectively orienting the transducer housing 32 such that the first transducer 34 is oriented at an angle A of zero, fifteen, forty-five, and ninety degrees below horizontal H in the water 22, with, as discussed, corresponding changes in orientation of the second transducer 36 without changing the fixed relative angular orientation between the two transducers.

In one implementation, the angle setting mechanism 54 may include a cable clip mechanism 56 configured to physically bend the cable 38 relative to the transducer housing 32 so as to selectively orient the housing 32. The cable clip 56 may couple with the housing 32 via a securement mechanism 58 configured to allow for repositioning the cable clip 56 to achieve a desired particular orientation and then securing the cable clip 56 to maintain the particular orientation. The angle setting mechanism 54 may incorporate substantially any suitable technology for accomplishing this function. In one implementation, the securement mechanism 58 may include interlocking teeth, and the securement mechanism 58 may be loosened to disengage the teeth to allow for repositioning the cable clip 56 and tightened to engage the teeth to secure the cable clip 56. The cable clip mechanism 56 and securement mechanism 58 may be integrated into the housing 32 and/or attach to the housing 32 to interface with the cable 38 at a distance away from the housing 32.

Referring also to FIG. 7, in one implementation, the system 20 may further include a support bar 60 configured to extend horizontally across the hole 26 in the ice 24 and to physically support the cable 38 so that the transducer housing 32 is positioned at a selected depth so as to be a particular distance of approximately between six inches and six feet below the ice 24. In one implementation, the support bar 60 may include a version of the angle setting mechanism 54 configured to allow for selectively orienting the transducer housing 32 at zero, fifteen, forty-five, and ninety degrees below horizontal H in the water 22. This implementation, in which the angle setting mechanism 54 is on the support bar 60, advantageously maintains the angle setting mechanism 54 in an easily accessible location above the water 22, and thereby increases the ease and speed of changing the angular orientation of the transducer housing 32 and the associated transducers 34, 36.

In one implementation, the system 20 may further include a float (not shown) coupled with the cable 38 and configured to physically support the cable 38 so that the transducer housing 32 is positioned at the selected depth. The angle setting mechanism 54 may also be used in conjunction with the float implementation.

Referring again to FIG. 1, in one implementation, the system 20 may further include a reel 64 configured to selectively wind to retract the cable 38 and to unwind to extend the cable 38. The reel 64 may include a reel body 66 around which the cable 38 may wind, and a reel handle 68 for turning the reel body 66 so as to wind (and unwind) the cable 38.

Embodiments of the system 20 may be employed and operated substantially as follows. The user may drill a plurality of spaced-apart holes 26 in the ice 24 over a lake or other body of water 22. The user may then lower the transducer unit 30 by the cable 38 through the hole 26 and into the water 22. With the transducer unit 30 oriented such that the first transducer 34 is fifteen degrees below horizontal H (or any desired angle provided by embodiments of the invention), and the display unit 40 receiving and processing data form the transducer units 34, 36, the user may view on the display monitor 48 the visual indications of the locations of fish and/or other underwater structure. If no fish are located or if fish are located a distance away, the user may withdraw the transducer unit 30 from the water 22 by pulling up the cable 38 and/or winding the cable 38 onto the reel 64, transport the system 20 to another hole 26 in the ice 24, and lower the transducer unit 30 into the water, by letting down the cable 38 and/or unwinding the cable 38 from the reel 64. The user may use the angle setting mechanism 54 to reorient the transducer housing 32 and thereby reorient the first and second transducers 34, 36 relative to horizontal H in order to maximize the likelihood of locating the fish or other structure.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A transducer system comprising:
a transducer unit including—
a transducer housing having an upper surface and containing only two transducers,
a first transducer oriented to output a first sonar beam in a first direction and associated with a first portion of the transducer housing, the first transducer being one of the two transducers in the transducer housing and configured to generate first sonar data corresponding to reflections of the first sonar beam in the first direction, and
a second transducer oriented to output a second sonar beam in a second direction and associated with a second portion of the transducer housing proximate to a lower surface of the transducer housing, the second transducer being one of the two transducers in the transducer housing and configured to generate second sonar data corresponding to reflections of the second sonar beam in the second direction;
an angle setting mechanism configured to allow for selectively orienting the transducer housing such that the first direction associated with the first sonar beam output by the first transducer is oriented to approximately forty-five degrees below horizontal in the water; and
a cable coupling the transducer unit to an electronic display unit and configured to electronically convey the first sonar data and the second sonar data generated by the first transducer and the second transducer, respectively, to the electronic display unit, the cable coupled with a float configured to physically suspend the transducer housing at a selected depth in the water;
wherein the cable is attached at the upper surface of the transducer housing such that the second direction associated with second sonar beam output by the second transducer is approximately ninety degrees below horizontal in the water; and
wherein the angle setting mechanism includes a cable clip mechanism configured to bend the cable so as to selectively orient the transducer housing.

2. The system of claim 1, wherein the first transducer includes a steered array transducer incorporating a phase steered technology.

3. The system of claim 1, wherein the first transducer includes a steered array transducer incorporating a frequency steered technology.

4. The system of claim 1, wherein the second transducer includes a conical transducer element.

5. The system of claim 1, wherein the second transducer includes a scanning transducer element.

6. The system of claim 1, wherein the cable includes a jacket constructed of a material which remains flexible in the water at least approximately between zero degrees and five degrees Celsius.

7. The system of claim 1, wherein the cable includes a Kevlar core.

8. The system of claim 1, further including a support bar configured to extend horizontally across a hole in ice over the water and to physically support the cable so that the transducer housing is positioned at a selected depth.

9. The system of claim 1, further including a reel configured to selectively wind to retract the cable and unwind to extend the cable.

10. A transducer system for locating fish in water, the transducer system comprising:
a transducer unit including—
a transducer housing including a lower surface and an upper surface, the transducer unit containing only two transducers,
a first transducer, which is a frequency steered transducer, oriented to output a first sonar beam in a first direction and associated with a first portion of the transducer housing, the first transducer being one of the two transducers in the transducer housing and configured to generate first sonar data corresponding to reflections of the first sonar beam in the first direction, and a second transducer oriented to output a second sonar beam in a second direction and associated with a second portion of the transducer housing, the second transducer being one of the two transducers in the transducer housing, positioned proximate to the lower surface of the transducer housing and configured to generate second sonar data corresponding to reflections of the second sonar beam in the second direction;

an angle setting mechanism configured to allow for selectively orienting the transducer housing such that the first direction associated with the first sonar beam output by the first transducer is oriented to approximately forty-five degrees below horizontal in the water; and a cable coupling the transducer unit to an electronic display unit and configured to electronically convey the first sonar data and the second sonar data generated by the first transducer and second transducer, respectively, to the electronic display unit, the cable coupled with a float configured to physically suspend the transducer housing at a selected depth in the water;

wherein the cable is attached to the transducer housing at the upper surface of the transducer housing such that the second direction associated with the second sonar beam output by the second transducer is approximately ninety degrees below horizontal in the water; and wherein the angle setting mechanism includes a cable clip mechanism configured to bend the cable so as to selectively orient the transducer housing.

11. The system of claim 10, wherein the second transducer includes a conical transducer element.

12. The system of claim 10, wherein the second transducer includes a scanning transducer element.

13. The system of claim 10, further including a support bar configured to extend horizontally across a hole in ice over the water and to physically support the cable so that the transducer housing is positioned at a selected depth.

14. A transducer system for locating fish in water beneath ice through a hole in the ice, the transducer system comprising:

a transducer unit including— a transducer housing including a lower surface and an upper surface, the transducer unit containing only two transducers, a first transducer, which is a frequency steered transducer, oriented to output a first sonar beam in a first direction and associated with a first portion of the transducer housing, the first transducer being one of the two transducers in the transducer housing and configured to generate first data regarding the location of one or more fish in the first direction, and a second transducer oriented to output a second sonar beam in a second direction and associated with a second portion of the transducer housing, the second transducer being one of the two transducers in the transducer housing, positioned proximate to the lower surface of the transducer housing and configured to generate second data regarding the location of one or more fish in the second direction, the second sonar beam being conical;

an angle setting mechanism configured to allow for selectively orienting the transducer housing such that the first direction associated with the first sonar beam output by the first transducer is oriented to approximately forty-five degrees below horizontal in the water; and a cable coupling the transducer unit to an electronic display unit and configured to electronically convey the data from the first and second transducers to the electronic display unit, the cable coupled with a float configured to physically suspend the transducer housing at a selected depth in the water;

wherein the cable is attached to the transducer housing at the upper surface of the transducer housing such that the second direction associated with the second sonar beam output by the second transducer is approximately ninety degrees below horizontal in the water; and wherein the angle setting mechanism includes a cable clip mechanism configured to bend the cable so as to selectively orient the transducer housing.

* * * * *